United States Patent
Gard et al.

(10) Patent No.: US 7,027,793 B2
(45) Date of Patent: Apr. 11, 2006

(54) DIRECT CONVERSION WITH VARIABLE AMPLITUDE LO SIGNALS

(75) Inventors: Kevin Gard, San Diego, CA (US); Anthony Segoria, San Diego, CA (US); Gurkanwal (Kamal) Sahota, San Diego, CA (US); Charles Persico, Rancho Santa Fe, CA (US)

(73) Assignee: Qualcomm Incorporated, San Diego, CA (US)

( * ) Notice: Subject to any disclaimer, the term of this patent is extended or adjusted under 35 U.S.C. 154(b) by 328 days.

(21) Appl. No.: 10/295,639

(22) Filed: Nov. 15, 2002

(65) Prior Publication Data

US 2004/0097214 A1    May 20, 2004

(51) Int. Cl.
*H04B 1/30* (2006.01)
(52) U.S. Cl. ............ 455/318; 455/251.1; 455/115.1; 455/226.1; 455/296; 375/297; 375/285
(58) Field of Classification Search ............ 455/127.1, 455/67.11, 127.2, 341, 78, 114.2, 115.1, 115.4, 455/118, 136, 324, 226.1, 232.1, 296, 251.1, 455/318, 323; 375/297, 285
See application file for complete search history.

(56) References Cited

U.S. PATENT DOCUMENTS

| 4,811,425 | A |   | 3/1989 | Feerst |
| 5,428,837 | A |   | 6/1995 | Bayruns et al. |
| 5,507,036 | A |   | 4/1996 | Vagher |
| 5,862,466 | A |   | 1/1999 | Erickson |
| 6,101,373 | A | * | 8/2000 | Samuels .................. 455/234.1 |
| 6,243,569 | B1 |   | 6/2001 | Atkinson |
| 6,393,266 | B1 |   | 5/2002 | Molnar |
| 6,516,185 | B1 |   | 2/2003 | MacNally |
| 6,798,845 | B1 | * | 9/2004 | Nakajima .................. 375/297 |
| 2002/0049046 | A1 |   | 4/2002 | Audinot |
| 2002/0094788 | A1 |   | 7/2002 | Hayashi et al. |
| 2002/0120937 | A1 |   | 8/2002 | Chang |
| 2002/0123319 | A1 | * | 9/2002 | Peterzell .................. 455/296 |
| 2002/0132597 | A1 | * | 9/2002 | Peterzell et al. ............ 455/130 |
| 2002/0163391 | A1 |   | 11/2002 | Peterzell |
| 2003/0013426 | A1 |   | 1/2003 | Kim et al. |

(Continued)

FOREIGN PATENT DOCUMENTS

| WO | 02056489 | 7/2002 |
| WO | 02056490 | 7/2002 |

*Primary Examiner*—Edward F. Urban
*Assistant Examiner*—Blane J. Jackson
(74) *Attorney, Agent, or Firm*—Philip R. Wadsworth; Charles D. Brown; George C. Pappas

(57) ABSTRACT

Techniques to reduce LO leakage by controlling the amplitude of LO signal based on the level of output signal after the frequency conversion process. An LO generator receives a VCO signal and generates an LO signal having a variable amplitude and a frequency that is related to the frequency of the VCO signal. A variable gain amplifier receives a control signal and adjusts the amplitude of the LO signal based on the control signal. The variable amplitude LO signal is used for frequency upconversion (e.g., direction upconversion) of an input signal (e.g., at baseband) to obtain an output signal (e.g., at RF). The relationship between LO signal amplitude and output signal level may be defined by a particular transfer function. In general, the LO signal is set higher for higher output signal level and is reduced proportionally for lower output signal level.

3 Claims, 6 Drawing Sheets

U.S. PATENT DOCUMENTS

| | | |
|---|---|---|
| 2003/0040292 A1 | 2/2003 | Peterzell et al. |
| 2003/0045249 A1 | 3/2003 | Nielson |
| 2003/0045263 A1 | 3/2003 | Wakayama et al. |
| 2003/0067359 A1 | 4/2003 | Darabi et al. |
| 2003/0181189 A1 | 9/2003 | Sorrells et al. |
| 2003/0216128 A1 | 11/2003 | Zhou |
| 2003/0216131 A1 | 11/2003 | Kovacevic et al. |
| 2003/0232605 A1 | 12/2003 | Peng |
| 2004/0176053 A1* | 9/2004 | Yamashita ............... 455/127.1 |
| 2004/0266359 A1* | 12/2004 | Ahmed ................... 455/67.14 |

* cited by examiner

DIRECT CONVERSION WITH VARIABLE AMPLITUDE LO SIGNALS

BACKGROUND

I. Field

The present invention relates generally to circuits, and more specifically to techniques for performing direct conversion using variable amplitude local oscillator (LO) signals.

II. Background

In a wireless communication system, data is normally processed (e.g., coded and modulated) digitally and then frequency upconverted from baseband to radio frequency (RF) to obtain an RF modulated signal more suitable for transmission over a wireless link. The frequency upconversion may be performed using various transmitter architectures. For a super heterodyne transmitter architecture, the frequency upconversion is performed by at least two stages—typically from baseband to intermediate frequency (IF) by a first stage, and then from IF to RF by a second stage. For a direct conversion transmitter architecture, the frequency upconversion is performed by a single stage—from baseband directly to RF. Each stage requires an LO signal to perform the upconversion from an input frequency (which is either baseband or IF) to an output frequency (which is either IF or RF).

An important design consideration for a transmitter is the amount of LO leakage in the RF modulated signal. An ideal frequency upconversion stage would receive an input signal and an LO signal and generate an output signal that is simply the input signal translated in frequency by the LO signal's frequency. However, because of imperfections in circuit components and/or due to circuit layout, some of the LO signal inevitably leaks into the output signal. The leaked LO signal acts as noise in the output signal and may further cause other degradation.

LO leakage is more problematic for a direct conversion transmitter because the frequency of the LO signal is set to the desired RF output frequency. For this transmitter, the LO signal can couple to the output signal resistively (e.g., via a silicon substrate) and/or magnetically (e.g., via inductors used for the LO circuit and the transmit signal path). In contrast, for a super heterodyne transmitter, the LO signals for the stages are not at the desired RF frequency, and LO coupling and gain distribution in the transmit signal path are normally such that LO leakage is not as severe.

LO leakage is also more problematic for a transmitter that is required to provide a wide range of adjustment in output power. One such application that requires this wide power adjustment is a Code Division Multiple Access (CDMA) communication system. On the reverse link in the CDMA system, the signal from each terminal is spectrally spread over the entire (e.g., 1.2288 MHz) system bandwidth. The transmitted signal from each terminal thus acts as interference to those from other terminals in the system. To minimize interference and increase system capacity, the transmit power of each terminal is adjusted such that the required received signal quality is maintained while minimizing interference to other terminals. On the forward link, the transmit power for the signal sent to each terminal is also adjusted so that more terminals may be served given a fixed amount of total transmit power. For some CDMA systems, a terminal may be required to be able to adjust its output power over a range of 85 dB or more.

When the output signal is at a high power level, the amount of LO leakage relative to the output signal is normally small, even for the direct conversion transmitter. However, when the output signal level is reduced, the LO leakage becomes more significant. In fact, the quality of the output signal is degraded as the amount of LO leakage approaches the desired signal level. For a direct conversion transmitter required to provide a wide range of output power, LO leakage needs to be properly addressed to ensure that the degradation due to LO leakage is acceptable even at the minimum output power level.

There is therefore a need in the art for techniques to mitigate LO leakage on an output signal when performing direct conversion.

SUMMARY

Techniques are provided herein to reduce LO leakage by controlling the amplitude of the LO signal based on the level of the output signal after the frequency conversion process. The LO signal may be set higher for higher level output signal, which can tolerate larger amounts of LO leakage. The LO signal may be reduced proportionally for lower level output signal, which is more susceptible to degradation due to LO leakage. A large LO signal is desirable for noise and linearity performance at high output signal levels. This requirement is reduced at low output signal levels. The transfer function between LO signal level and output signal level may be defined such that carrier (or LO) suppression and other related specifications and performance criteria can be achieved.

An embodiment provides an integrated circuit comprised of an LO generator and a variable gain amplifier. The LO generator receives a voltage controlled oscillator (VCO) signal (or a version of the VCO signal) and generates an LO signal having a variable amplitude and a frequency that is related to the frequency of the VCO signal. The variable gain amplifier receives a control signal and adjusts the amplitude of the LO signal based on the control signal. The variable amplitude LO signal is used for frequency upconversion (e.g., direction upconversion) of an input signal (e.g., at baseband) to obtain an output signal (e.g., at radio frequency (RF)). Quadrature LO generation and frequency upconversion may be performed, in which case the input signal is made up of inphase (I) and quadrature (Q) signals, and the LO signal is made up of I and Q LO signals.

The output signal may be derived from an upconverted signal, which is generated by the frequency conversion. For example, the output signal may be generated by amplifying the upconverted signal with a variable gain and would then have a variable signal level. The amplitude of the LO signal may then be made dependent on the output signal level. The LO signal amplitude and output signal level may be related by a particular transfer function. This transfer function may be defined such that the LO signal amplitude is approximately constant for output signal level above a particular threshold and is proportional to the output signal level (based on a particular gain slope) below this threshold. The threshold and/or the gain slope may be selectable or programmable.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
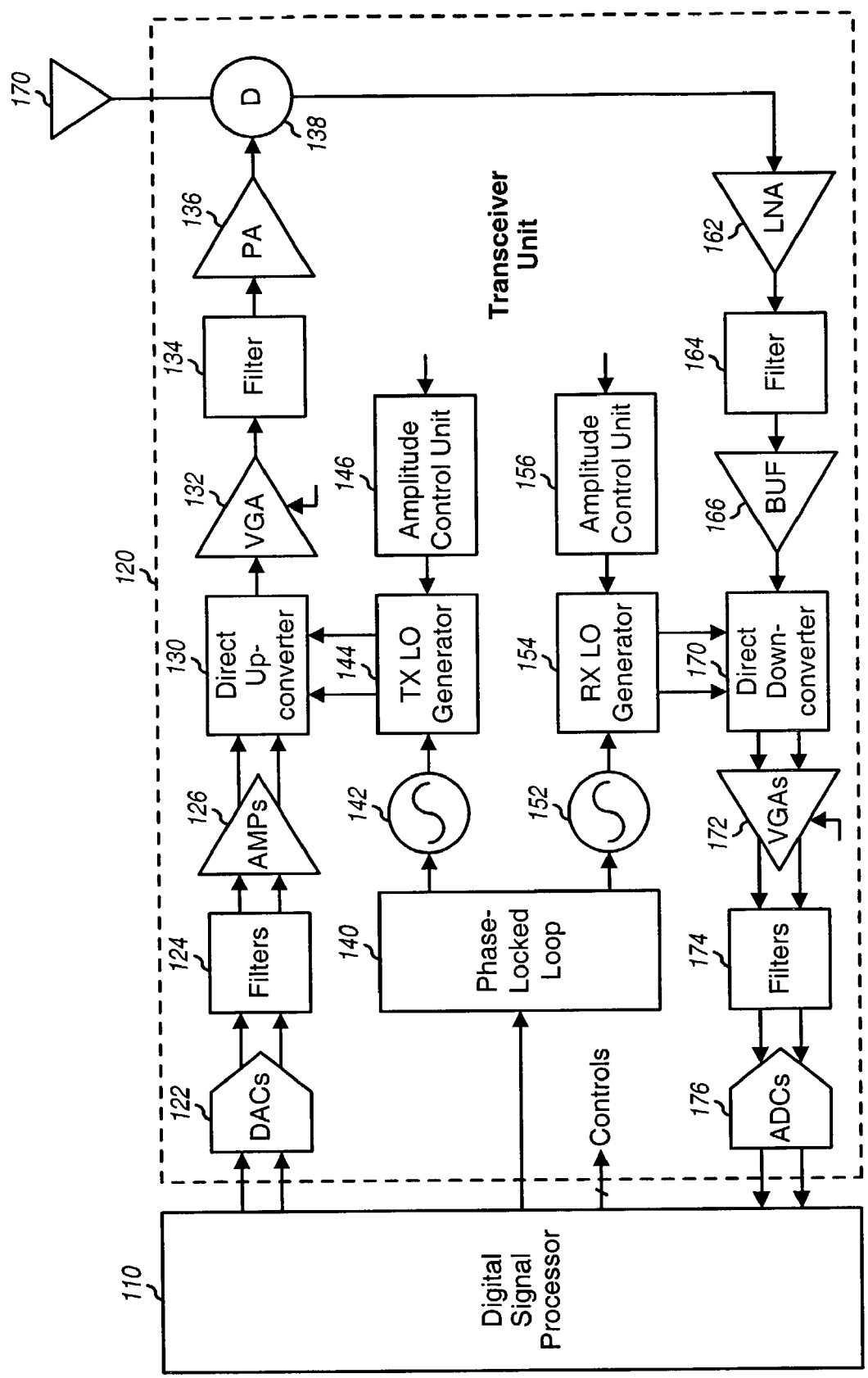
FIG. 1 shows a block diagram of a transceiver unit.

FIG. 1 shows a block diagram of an embodiment of a transceiver unit 120 that may be used for wireless communication. Transceiver unit 120 includes a transmitter and a receiver and may be used in a terminal (e.g., a cellular phone or handset) or a base station in a CDMA system. Transceiver unit 120 may also be used in devices for other communication systems.

On the transmit path, a digital signal processor 110 provides digital data as an inphase (I) and a quadrature (Q) data stream. The I and Q data streams are converted to I and Q analog signals by digital-to-analog converters (DACs) 122, filtered by filters 124 to remove images caused by the digital-to-analog conversion, and amplified by amplifiers (AMPs) 126.

A direct upconverter 130 receives the amplified I and Q signals from amplifiers 126 and I and Q LO signals from a transmit (TX) LO generator 144. Direct upconverter 130 then performs direct upconversion of the amplified I and Q signals from baseband directly up to RF using the I and Q LO signals. The upconverted signal is then amplified by a variable gain amplifier (VGA) 132, filtered by a filter 134, and further amplified by a power amplifier (PA) 136 to generate an RF modulated signal. The RF modulated signal is then routed through a duplexer (D) 138 and transmitted from an antenna 170.

On the receive path, a signal is received by antenna 170, routed through duplexer 138, amplified by a low noise amplifier (LNA) 162, filtered by a filter 164, and buffered by a buffer 166. A direct downconverter 170 receives the buffered signal from buffer 166 and I and Q LO signals from a receive (RX) LO generator 154. Downconverter 170 then performs direct downconversion of the buffered signal from RF directly down to baseband using the I and Q LO signals. The baseband I and Q signals are then amplified by VGAs 172, filtered by filters 174, and digitized by analog-to-digital converters (ADCs) 176 to provide samples. The samples are then provided to digital signal processor 110 for further processing.

Voltage controlled oscillators (VCOs) 142 and 152 provide VCO signals used to generate LO signals, which are then used for frequency upconversion and downconversion, respectively. A VCO signal is a periodic signal with a particular fundamental frequency ($f_{VCO}$) and may be of any waveform (e.g., sinusoidal, square wave, sawtooth, and so on). Since different frequencies are used for the forward link (or downlink) and reverse link (or uplink) in a CDMA system, the VCO signals from VCOs 142 and 152 may have the same or different frequencies, depending on the design of LO generators 144 and 154. A phase locked loop (PLL) 140 receives information from digital signal processor 110 and provides controls used to adjust the frequency and/or phase of VCOs 142 and 152. VCOs 142 and 152 may also be implemented with some other type of oscillator.

TX LO generator 144 receives the VCO signal from VCO 142 and generates the I and Q LO signals for direct upconverter 130. Similarly, RX LO generator 154 receives the VCO signal from VCO 152 and generates the I and Q LO signals for direct downconverter 170. Amplitude control units 146 and 156 receive controls from processor 110 and generate amplitude control signals used to adjust the amplitude of the LO signals from LO generators 144 and 154, respectively.

FIG. 1 shows a specific transceiver design. In a typical transceiver, the conditioning of the signals in the transmit and receive paths may be performed by one or more stages of amplifier, filter, and so on, which may be arranged different from that shown in FIG. 1, as is known in the art. Other circuit blocks not shown in FIG. 1 may also be used to condition signals in the transmit and received paths.

FIG. 1 also shows direct conversion being used for both the transmit and receive paths. In other designs, direct conversion may be used for only the transmit path or only the receive path. As used herein, direct conversion can refer to direct upconversion, direct downconversion, or both direct upconversion and downconversion, depending on the context in which the term is used.

Direct conversion may also be used for various modulation schemes including BPSK, QPSK, PSK, QAM, and so on, which are all well known in the art. For clarity, direct upconversion is described below for QPSK, where I and Q baseband signals are upconverted using I and Q LO signals. In the following description, an LO signal can refer to both I and Q LO signals, or just an I or a Q LO signal, depending on the context in which the term is used.

Figure 2:
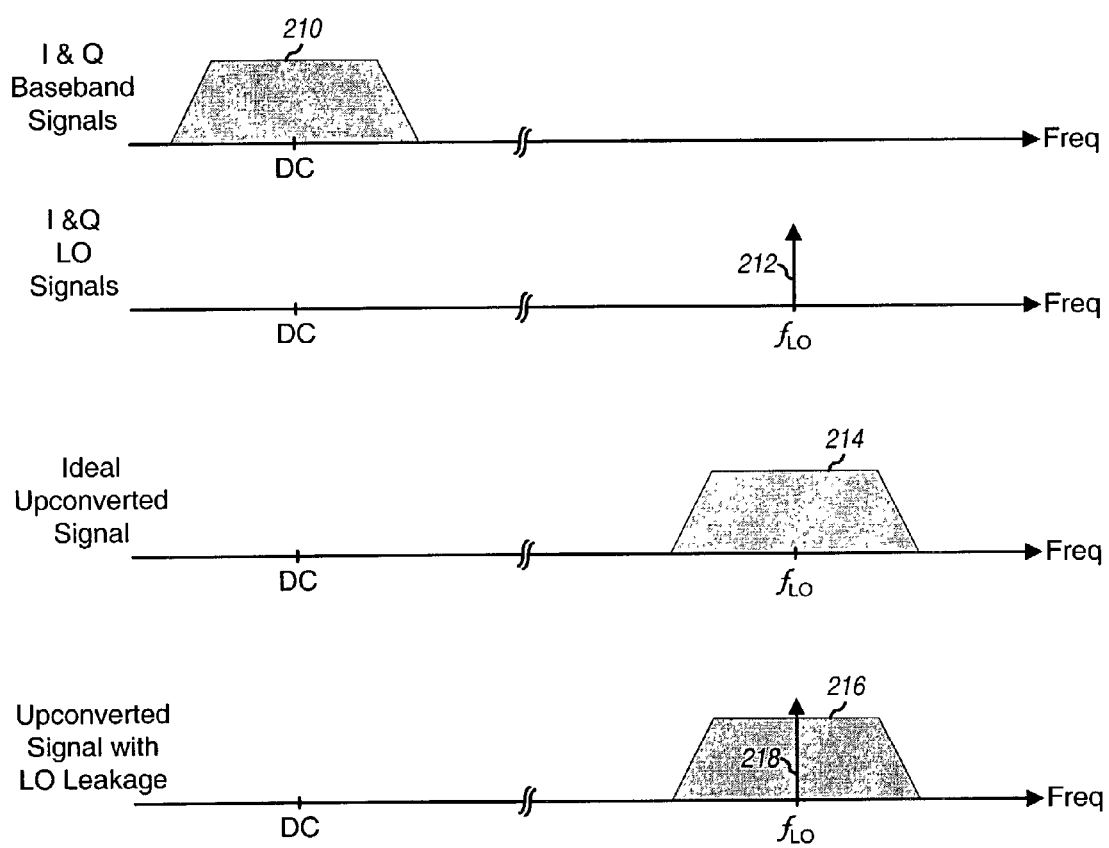
FIG. 2 graphically illustrates the direct upconversion process.

FIG. 2 graphically illustrates the direct upconversion process. The I and Q baseband signals 210 are centered at direct current (DC) (i.e., 0 Hertz) and the I and Q LO signals 212 are periodic signals with a fundamental frequency of $f_{LO}$. For an ideal direct upconverter, the upconverted signal 214 is simply the sum of the I and Q baseband signals translated in frequency by the I and Q LO signals, respectively, and does not include any portion of the LO signals. However, because of imperfections in circuit components and/or due to circuit layout, the upconverted signal 216 from a practical direct upconverter includes a portion of the LO signals due to LO leakage. The leaked LO signal 218 is within the bandwidth of the upconverted signal and may degrade the quality of the upconverted signal if it is sufficiently large relative to the desired signal level.

As used herein, "amplitude", "signal level", and "power level" are all related to the magnitude of a desired signal. Although "amplitude" may be more commonly used for some types of signal (e.g., periodic, LO, and VCO signals) and "level" may be more commonly used for some other types of signal (e.g., a modulated signal), all of these terms may be used for any given signal.

Figure 3:
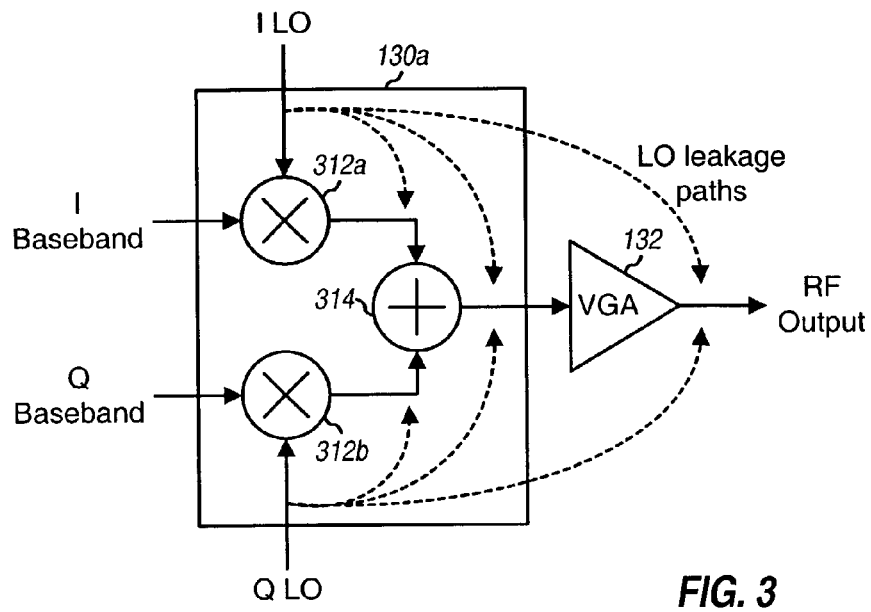
FIG. 3 shows a block diagram of a direct upconverter.

FIG. 3 shows a block diagram of an embodiment of a direct upconverter 130a, which may be used for direct upconverter 130 in FIG. 1. In this embodiment, direct upconverter 130a includes a pair of mixers 312a and 312b coupled to a summer 314. The I and Q baseband signals from amplifiers 126 in FIG. 1 are provided to mixers 312a and 312b, respectively, which also receive the I and Q LO signals, respectively from TX LO generator 144. Each mixer 312 upconverts its baseband signal with its LO signal to generate an upconverted component. Summer 314 then sums the I and Q components from mixers 312a and 312b, respectively, to generate the upconverted signal. The upconverted signal from direct upconverter 130*a* is amplified by VGA 132 to provide an output signal (or RF output) having a variable signal level.

FIG. 3 also shows the LO leakage paths for a direct conversion transmitter. If the direct conversion transmitter is implemented on an RF integrated circuit (RFIC), then the primary LO leakage mechanisms are (1) conduction of the LO signals through a resistive silicon substrate, (2) magnetic coupling between inductors used for the LO circuit and inductors used for other circuits in the transmit signal path after the frequency upconverter, (3) DC offsets in the circuits at baseband, and (4) capacitive coupling between signal traces.

The resistive substrate conduction occurs as follows. On an RFIC, an inductor is often implemented as a spiral metal line over the silicon substrate. The metal line forms the top plate of a capacitor, and the resistive silicon substrate forms the bottom plate of the capacitor. A high frequency LO signal on the inductor is then capacitively coupled to the substrate. The substrate provides a resistive conduction path for coupling the LO signal to other circuits that are coupled or connected to the substrate.

The magnetic coupling occurs as follows. A high frequency current of the LO signal flowing through the spiral inductor generates a magnetic field, which couples to other inductors or signal traces for other circuits. The coupled magnetic field causes a version of the LO signal to be induced on the other inductors and/or traces. The amount of magnetic coupling may be reduced by careful layout of the inductors and by following other design guidelines that are known in the art.

As noted above, LO leakage is more problematic for a direct conversion transmitter than a super heterodyne transmitter. LO coupling is worse at RF than at IF frequencies because capacitive coupling to the conductive substrate increases with frequency. Since the LO signal used in the direct conversion transmitter is at the desired RF whereas the LO signals used in the super heterodyne transmitter are typically at IF (or some other frequency lower than the desired RF), higher LO leakage can be expected for the direct conversion transmitter. Moreover, the overall gain for the transmit signal path may be distributed among IF and RF stages in the super heterodyne transmitter so that sensitivity and LO leakage are not as severe. This gain distribution is not possible for the direct conversion transmitter because there is no IF. For these reasons, LO leakage needs to be more carefully addressed for the direct conversion transmitter to achieve the desired performance.

As also noted above, the quality of the RF modulated signal is degraded if the undesired LO leakage approaches the desired output signal level. As a specific example, a CDMA terminal needs to maintain a signal-to-noise ratio (SNR) of 6 dB or better at the minimum specified output power level. A reasonable design budget for carrier (or LO) suppression may be 10 dBc (i.e., the LO leakage should be 10 dB below the LO signal level) at the minimum specified output power level. This would then ensure that the required SNR can be achieved for the worst case operating point, assuming that no other factors noticeably degrade SNR.

Techniques are provided herein to reduce LO leakage by controlling the amplitude of the LO signal based on the output signal level. For example, the LO signal may be set at a normal or nominal level for higher output signal levels, and may be set at reduced levels for lower output signal levels. The relationship between the LO signal level and output signal level may be defined by a particular transfer function, as described below.

Figure 4:
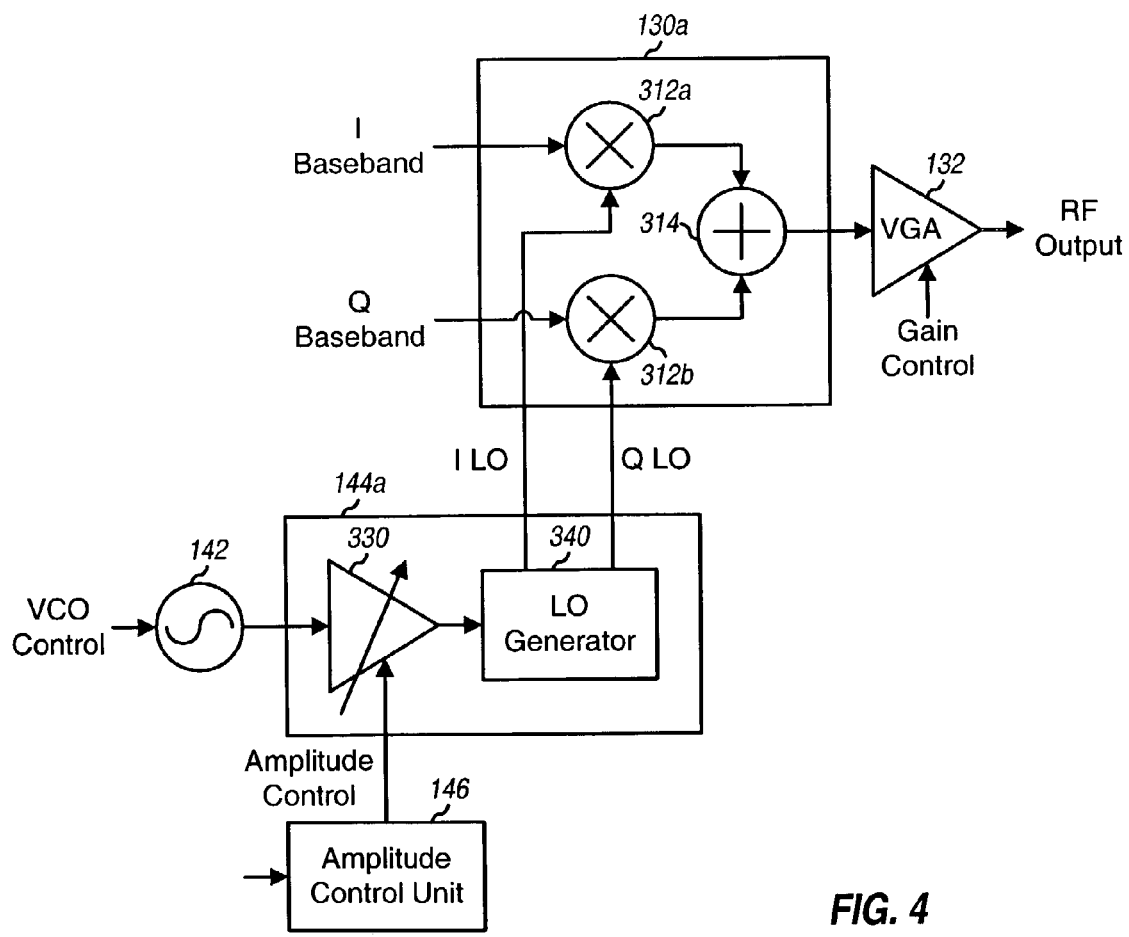
FIG. 4 shows a block diagram of a variable amplitude LO generator.

FIG. 4 shows a simple block diagram of an embodiment of a variable amplitude LO generator 144*a*, which may be used for TX LO generator 144 and RX LO generator 154 in FIG. 1.

In this embodiment, variable amplitude LO generator 144*a* includes a variable gain amplifier 330 coupled to an LO generator 340. Amplifier 330 receives a VCO signal from VCO 142 and an amplitude control signal and provides a "switching" signal having an amplitude determined by the control signal and a frequency determined by the frequency of the VCO signal. The switching signal may thus be viewed as a version of the VCO signal. LO generator 340 receives the switching signal (and possibly also the VCO signal) and generates I and Q LO signals having variable amplitude. The LO signal amplitude is dependent on the switching signal amplitude, which in turn is dependent on the control signal. The variable amplitude I and Q LO signals are provided to direct upconverter 130*a*.

FIG. 4 shows a symbolic representation of the variable amplitude LO generator, which may be implemented with various designs. Depending on the specific design, the signal flow may be different from that shown in FIG. 4. For example, variable gain amplifier 330 may be placed after LO generator 340 and used to adjust the amplitude of the I and Q LO signals. As another example, variable gain amplifier 330 may be integrated within LO generator 340. In general, the frequency of the I and Q LO signals is dependent on the frequency of the VCO signal, and the amplitude of the I and Q LO signals is dependent on the amplitude control signal.

As noted above, LO leakage is not as critical at higher output signal levels but becomes more problematic at lower output signal levels. The LO signal level may then be adjusted based on the output signal level.

Figure 5:
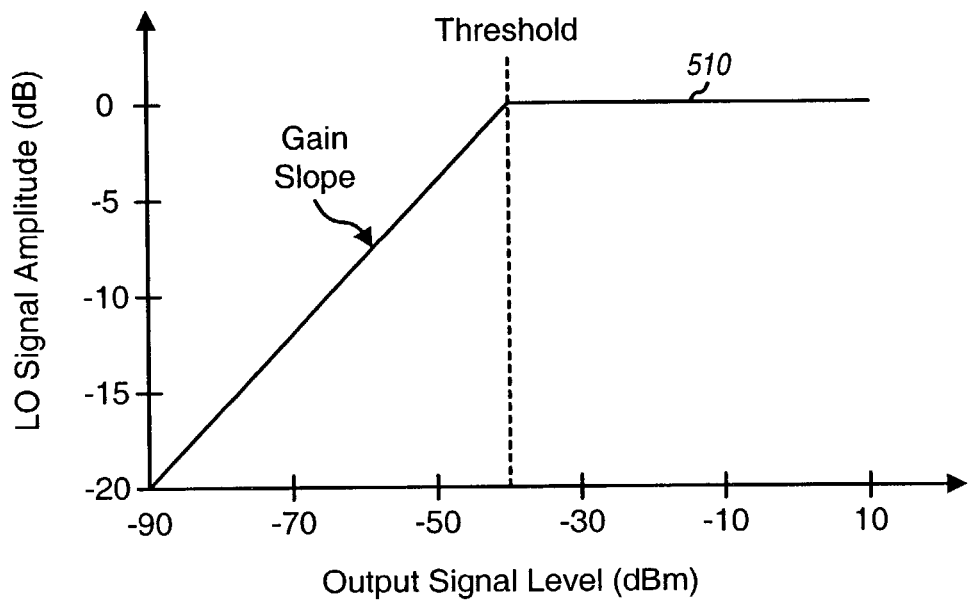
FIG. 5 shows an example transfer function for LO signal amplitude versus output signal level.

FIG. 5 shows an example transfer function 510 for LO signal amplitude or level versus output signal level. The vertical axis represents the LO signal amplitude, which is given in units of dB (i.e., the LO signal amplitude is given relative to the nominal LO signal amplitude). The horizontal axis represents the output signal level, which is given in units of dBm.

In an embodiment and as shown by transfer function 510 in FIG. 5, the LO signal is maintained at the nominal amplitude until the output signal level reaches a particular threshold level. As the output signal level falls below this threshold level, the LO signal level is adjusted correspondingly by adjusting the gain of the variable gain amplifier for the LO generator. The gain slope below the threshold level indicates the rate at which the LO signal level is attenuated in comparison to the output signal level. The threshold level and/or the gain slope may be selectable or programmable parameters for the transceiver, and may be determined based on the amount of attenuation in the LO leakage required in order to meet carrier suppression and/or any other related specifications.

The transfer function for LO signal level versus output signal level shown in FIG. 5 represents one example function. The relationship between LO signal level and output signal level may also be defined based on various other functions, and this is within the scope of the invention.

For the transceiver design shown in FIGS. 1 and 4, the output signal level is determined by and is directly related to the gain of VGA 132. The gain control signal for VGA 132 determines this gain and may thus be used to estimate the output signal level. A transfer function may then be defined for LO signal level versus gain control for VGA 132. Since the LO signal level is varied based on the output signal level, which in turn is dependent on the VGA gain, the amplitude control for the LO generator may then be derived based on the gain control for the VGA.

When a high amplitude LO signal is applied to a mixer (e.g., mixer 312a or 312b in FIG. 4), the mixer behaves like a switch and the signal level of the upconverted signal is dependent mostly on the baseband signal level (and not the LO signal level). However, when a low amplitude LO signal is applied to the mixer, the mixer behaves like a multiplier and the upconverted signal level is dependent on both the baseband signal level and the LO signal level. Thus, the amplitude adjustment for the LO signal may affect the output signal level (especially at medium to low LO signal amplitude), and may be taken into account or incorporated into the design of the gain control for the output signal.

The amplitude of the LO signal may also affect other characteristics of the mixer. For example, the linearity of the mixer and the amount of noise generated by the mixer both may be dependent on the LO signal amplitude. For a combination of reasons, better performance may be achieved by using higher amplitude LO signal for higher output signal levels when higher amounts of LO leakage can be tolerated.

The threshold level and/or gain slope to use for the variable amplitude LO generator may be determined in various manners. In one embodiment, LO leakage may be determined for various output signal levels for an ensemble of transceiver units based on empirical measurements, computer simulation, and so on. This information may then be used to characterize the transceiver design. The threshold level and/or gain slope may then be selected such that carrier suppression specification can be met for the worse transceiver unit that can be expected. In another embodiment, LO leakage may be measured (e.g.; during normal operation) by a transceiver unit, and the threshold level and/or gain slope may be selected such that the carrier suppression specification can be met for the transceiver unit. In yet another embodiment, the threshold level and/or gain slope may be adjusted based on one or more parameters or criteria that can be quantified by the transceiver unit. Such parameters may include linearity, output noise, conversion gain, and so on.

Figure 6:
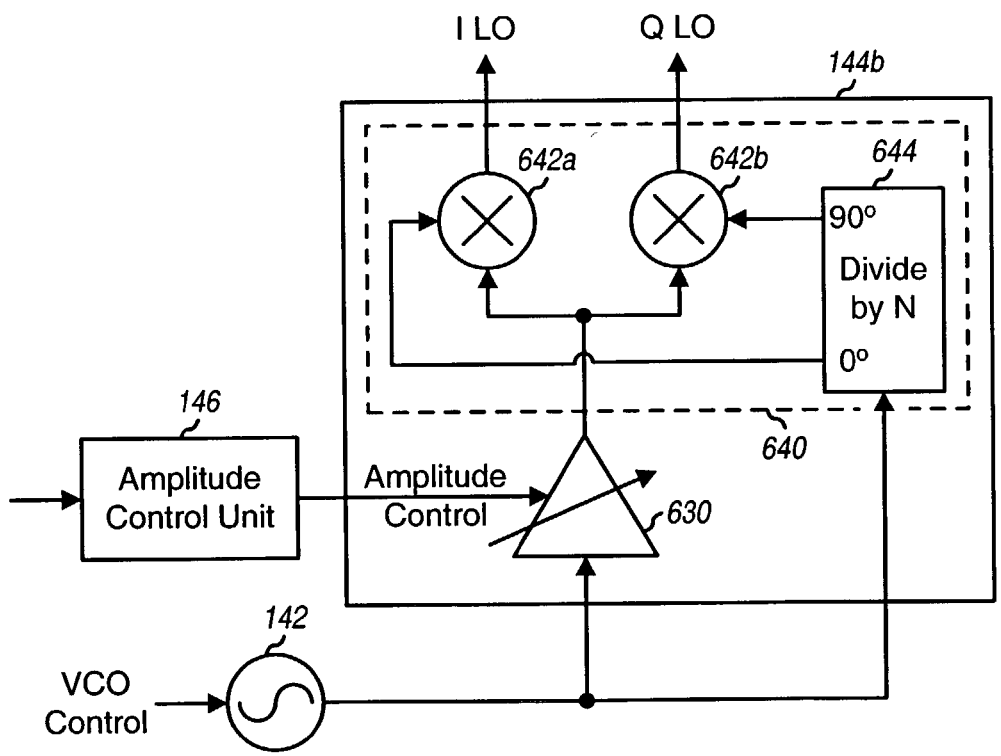
FIGS. 6 and 7 respectively show a block diagram and a schematic diagram of a variable amplitude quadrature LO generator.

FIG. 6 shows a block diagram of a variable amplitude quadrature LO generator 144b, which is one embodiment of LO generator 144a. In this embodiment, variable amplitude quadrature LO generator 144b includes a variable gain amplifier 630 and an LO generator 640. LO generator 640 further includes a pair of mixers 642a and 642b and a divide by N unit 644.

Amplifier 630 receives the VCO signal from VCO 142 and the amplitude control signal and provides a switching signal having an amplitude determined by the control signal and a frequency determined by the frequency of the VCO signal. Divide by N unit 644 also receives the VCO signal and generates I and Q "mixer LO" signals having a frequency that is 1/N-th of the frequency of the VCO signal, where N can be any positive integer one or greater. Divide by N unit 644 thus performs a frequency divide by N of the VCO signal.

Mixers 642a and 642b receive the switching signal from amplifier 630 and the I and Q mixer LO signals, respectively, from divide by N unit 644. Each mixer 642 mixes the switching signal with its mixer LO signal to generate a respective LO signal having an amplitude that is dependent on the switching signal amplitude. The LO signal amplitude is thus controlled by the amplitude control signal. If the frequency of the VCO signal is $f_{VCO}$, then the frequency of the switching signal is $f_{VCO}$ and the frequency of the mixer LO signal is $f_{VCO}/N$. For a double sideband mixer, the frequency of the LO signal is $$\frac{(N \pm 1)}{N} f_{VCO},$$

which includes the sum frequency ($f_{VCO}+f_{VCO}/N$) and the difference frequency ($f_{VCO}-f_{VCO}/N$) for the switching and mixer LO signals. One of the frequencies is normally filtered out, leaving the other frequency behind for the LO signal. For a single sideband mixer, the frequency of the LO signal is either the sum frequency ($f_{VCO}+f_{VCO}/N$) or the difference frequency ($f_{VCO}-f_{VCO}/N$), depending on the design of the single sideband mixer. In general, mixers 642a and 642b may each be a single sideband mixer or a double sideband mixer.

The generation of the LO signal by mixing two signals (i.e., the switching and mixer LO signals) can provide certain benefits. First, VCO 142 does not need to be operated at the frequency of the LO signal, which can reduce LO leakage from the VCO onto the output signal. Second, LO signal at various frequencies (e.g., for different operating bands) may be readily obtained by selecting the proper value for N.

FIG. 6 shows a symbolic representation of the variable amplitude quadrature LO generator, which may be implemented with various designs. Depending on the specific design, the signal flow may be different from that shown in FIG. 6. For example, variable gain amplifier 630 may be used to control the gain of mixers 642a and 642b to adjust the amplitude of the switching signal.

Figure 7:
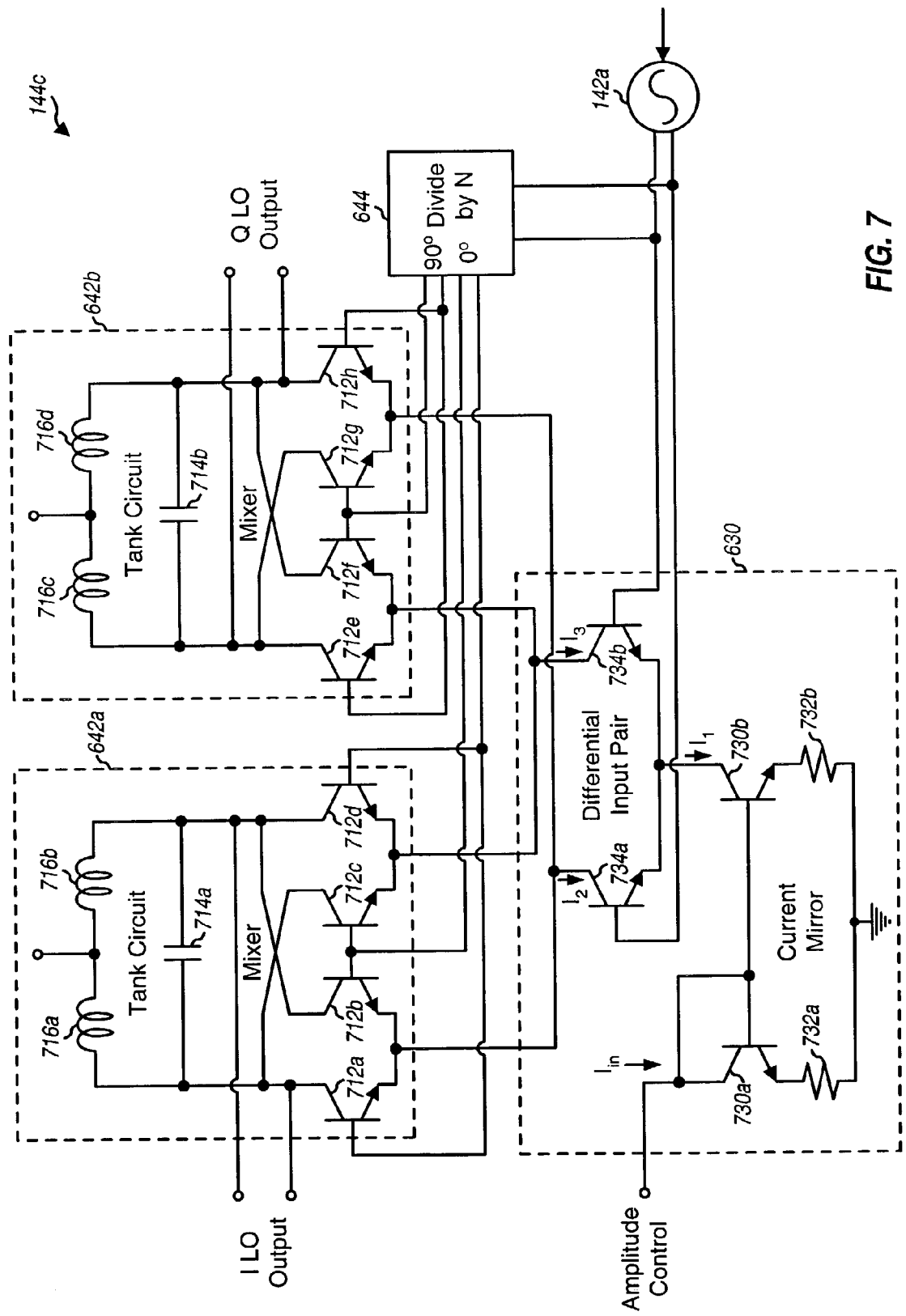

FIG. 7 is a schematic diagram of an embodiment of a variable amplitude quadrature LO generator 144c, which is a specific design for quadrature LO generator 144b in FIG. 6.

In this embodiment, variable gain amplifier 630 includes a current mirror coupled to a different input pair. The current mirror includes NPN transistors 730a and 730b and resistors 732a and 732b. The bases of transistors 730a and 730b couple together and to the collector of transistor 730a, which also receives a current $I_{in}$ for the amplitude control signal. The emitters of transistors 730a and 730b couple to one end of resistors 732a and 732b, respectively, and the other end of these resistors couple to circuit ground. The different input pair includes NPN transistors 734a and 734b having bases that receive a differential VCO signal from VCO 142 and emitters that couple together and to the collector of transistor 730b.

Mixer 642a includes NPN transistors 712a, 712b, 712c and 712d, capacitor 714a, and inductors 716a and 716b. Transistors 712a and 712b have bases that receive a differential I mixer LO signal from divide by N unit 644 and emitters that couple together and to the collector of transistor 734a. Transistors 712c and 712d have bases that couple to the bases of transistors 712b and 712a, respectively, emitters that couple together and to the collector of transistor 734b, and collectors that couple to the collectors of transistors 712a and 712b, respectively. Inductors 716a and 716b couple in series, the combination of which couples in parallel with capacitor 714a to form a tank circuit. The tank circuit (i.e., the two ends of capacitor 714a) couples to the collectors of transistors 712a and 712b, which provide a differential I LO signal. Mixer 642b includes the same circuit components as mixer 642a. For mixer 642b, the emitters of NPN transistors 712e and 712f coupled together and to the collector of transistor 734a, the emitters of transistors 712g and 712h couple together and to the collector of transistor 734b, the collectors of transistors 712e and 712f couple to the collectors of transistors 712g and 712h, respectively, and the collectors of transistors 712e and 712f provide a differential Q LO signal.

Divide by N unit 644 receives the differential VCO signal, divides the VCO signal by a factor of N, and provides the differential I and Q mixer LO signals that are 90 degrees out of phase. N is typically a factor of two but in general may be any positive integer.

Variable amplitude quadrature LO generator 144c operates as follows. The input current $I_{in}$ for the amplitude control signal is provided to the collector of transistor 730a. Because of the current mirror design, the current $I_1$ through transistor 730b is determined by the input current $I_{in}$ through transistor 730a and the ratio of resistor 732a to resistor 732b. If the resistor ratio is unity or 1.0, then the current through transistor 730b is equal to the input current (i.e., $I_1 = I_{in}$).

The differential input pair is driven by the differential VCO signal, which alternately switches the current $I_1$ through transistors 734a and 734b at the rate of $f_{VCO}$, which is the frequency of the VCO signal. The currents through transistors 734a and 734b thus switch at a rate determined by the VCO signal and have amplitudes determined by the input current $I_{in}$. The current $I_2$ through transistor 734a is the "bias tail" current for mixer 642a, and the current $I_3$ through transistor 734b is the bias tail current for mixer 642b. The average bias tail current for each mixer is $I_{in}/2$.

Each mixer 642 is driven by a respective differential mixer LO signal from divide by N unit 644 having a frequency of $f_{VCO}/N$. The differential LO output from each mixer (e.g., the differential signal at the collectors of transistors 712a and 712b for mixer 642a) includes the sum and difference frequencies of the switching and mixer LO signals. The tank circuit is tuned to either the sum frequency or the difference frequency and operates to (1) pass the desired frequency to which it is tuned and (2) filter out the undesired frequency and other spurious signals and noise. The tank circuit also performs current-to-voltage conversion to provide a voltage signal for the differential LO signal.

FIG. 7 shows a design whereby variable amplitude quadrature LO generator 144c is implemented with bipolar transistors. In general, a variable gain LO generator may be implemented using any process technology including CMOS, BiCMOS, GaAs, and so on.

The I and Q LO signals from mixers 642a and 642b are voltage signals with amplitudes that are linearly proportional to the bias tail currents $I_2$ and $I_3$ for the mixers, which are proportional to the input current $I_{in}$ for the amplitude control signal. It is sometimes desirable to adjust the amplitudes of the I and Q LO signals exponentially based on linear changes in an input control signal. This kind of relationship is referred to as "linear-in-dB". The linear-in-dB control can be achieved by generating the input current $I_{in}$ to be exponentially dependent on the input control signal.

Figure 8:
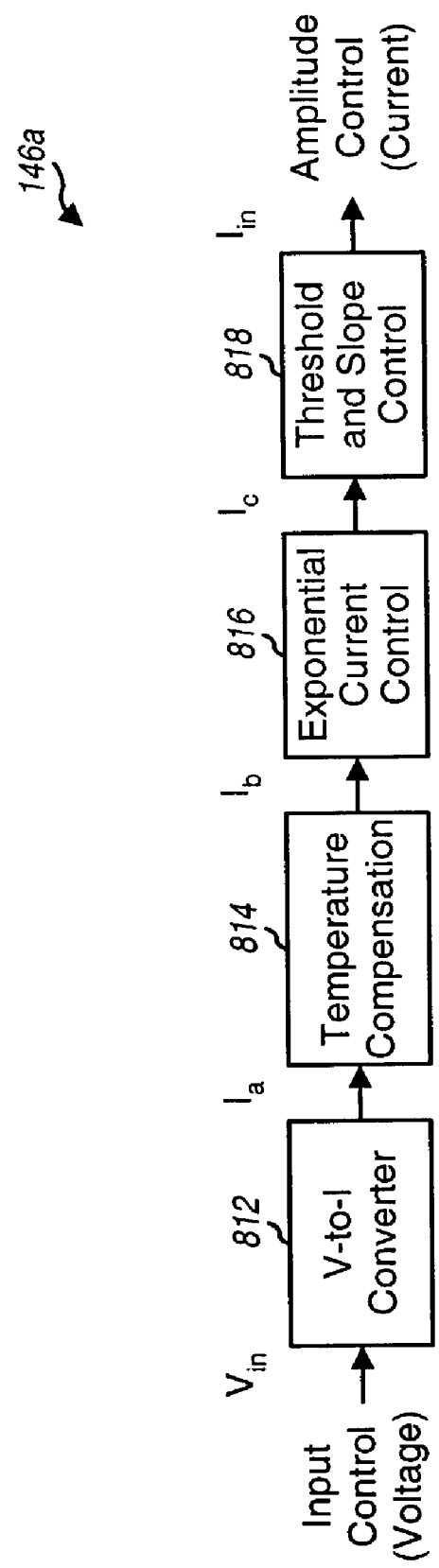
FIG. 8 is a block diagram of an amplitude control unit.

FIG. 8 is a block diagram of an amplitude control unit 146a, which is one embodiment of unit 146 in FIG. 1. Unit 146a receives the input control signal (which may be a voltage signal) and generates the amplitude control signal (which may be a current signal).

Within unit 146a, a voltage-to-current (V-to-I) converter 812 converts the voltage $V_{in}$ for the input control signal into a current $I_a$ (i.e., $I_a \propto V$). A unit 814 then performs temperature compensation on the current $I_a$ to provide a temperature compensated current $I_b$. The temperature compensation ensures that the amplitude of the I and Q LO signals remains approximately constant over temperature variation, which may improve performance. A unit 816 then converts the temperature compensated current $I_b$ into a current $I_c$ that is exponentially related to the current $I_b$ (i.e., $I_c \propto e^{I_b}$). This exponential function is used to provide linear-in-dB control (i.e., the LO signal amplitude is linear, in dB, with respect to the current $I_b$).

A threshold and slope control unit 818 then receives the current $I_c$ and generates the input current $I_{in}$ for the amplitude control signal. In particular, unit 818 clips the current $I_c$ to a particular nominal value until it falls below the threshold value, which may be selectable or programmable. Unit 818 further provides a means for adjusting the rate at which the input current $I_{in}$ depends on the current $I_c$. This rate may also be selectable or programmable. Unit 818 provides the input current $I_{in}$ to the current mirror in the variable amplitude quadrature LO generator 144c shown in FIG. 7. The threshold and/or gain slope may be set at design time, during manufacturing, during normal operation, and so on.

For clarity, specific embodiments and design have been described above. The techniques described herein for performing direct conversion using variable amplitude LO signal to mitigate LO leakage may be used for various systems and applications. For example, these techniques may be used for direction upconversion (described above) and direct downconversion. For a direct downconversion receiver, the amplitude of the LO signal may be adjusted based on the amplitude of the received signal (e.g., the output of buffer 166 in FIG. 1).

The techniques described herein may be used for quadrature modulation (e.g., QPSK, QAM, and so on, as described above) as well as non-quadrature modulation (e.g., BPSK). For non-quadrature modulation, only one LO signal (instead of quadrature I and Q LO signals) is used for frequency conversion.

The techniques described herein for performing direct conversion using variable amplitude LO signals may be implemented by various means. For example, these techniques may be implemented in hardware, software, or a combination thereof. For a hardware implementation, the elements used to implement any one or a combination of the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An integrated circuit comprising:
   a local oscillator (LO) generator operative to receive a voltage controlled oscillator (VCO) signal and generate an LO signal having a variable amplitude and a frequency that is related to the frequency of the VCO signal;

a variable gain amplifier operative to receive a first control signal and adjust the amplitude of the LO signal based on the first control signal, wherein the variable amplitude LO signal is used for frequency upconversion of an input signal to obtain an output signal, the LO generator including a divider unit operative to receive the VCO signal and generate a mixer LO signal having a frequency that is related to the frequency of the VCO signal; and a mixer operative to receive and mix the mixer LO signal with a version of the VCO signal to provide the LO signal.

2. The integrated circuit of claim 1, wherein the divider unit is operative to divide the frequency of the VCO signal by a factor of N to generate the mixer LO signal, where N is a positive integer.

3. The integrated circuit of claim 1, wherein the mixer is a single sideband mixer.

* * * * *